United States Patent Office

Re. 26,468
Reissued Oct. 1, 1968

26,468

GAS-GENERATING COMPOSITIONS CONTAINING HYDROXYL AMMONIUM OXALATE COOLANTS AND METHOD FOR THEIR PREPARATION

Ernest S. Sutton, Jr., Newark, Del., assignor to Thiokol Chemical Corporation, Bristol, Pa., a corporation of Delaware No Drawing. Original No. 3,193,421, dated July 6, 1965, Ser. No. 266,497, Mar. 20, 1963. Application for reissue Jan. 24, 1967, Ser. No. 617,429
24 Claims. (Cl. 149—19)

Matter enclosed in heavy brackets [ ] appears in the original patent but forms no part of this reissue specification; matter printed in italics indicates the additions made by reissue.

*ABSTRACT OF THE DISCLOSURE*

*Curable gas generating compositions composed essentially of hydroxyl ammonium oxalate as a coolant, a perchlorate salt oxidizer, a combustible fuel binder, and optional propellant adjuvants such as plasticizers, ballistic agents, hygroscopicity inhibitors, or combustion catalysts.*

This invention relates to solid fuel compositions useful, for generating gas upon combustion and to methods for utilizing these compositions.

More particularly this invention concerns the addition of hydroxyl ammonium oxalate to perchlorate based gas generating compositions to improve their combustion characteristics so that they can be used for gas turbine and jet engine applications.

The novel coolant of this invention has the structure:

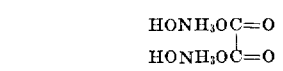

Hydroxyl ammonium oxalate is prepared according to the method described by P. F. Tryon in pages 83–85, vol. III, Inorganic Synthesis 1950, First Edition, published by McGraw-Hill Book Company, Inc. of New York.

Within recent years, especially where applications in the aerospace or aeronautical fields are concerned, there has been an increasing reliance upon the use of devices driven or activated through the generation of gases. These devices commonly derive their energy from the controlled combustion of solid gas generating compositions in the gas turbine engines. The combustion of these solid compositions to gaseous products can be used to pressurize a fluid or drive a turbine to produce mechanical or electrical energy or to start various mechanical devices. The gas-generating devices are particularly advantageous in that they are capable of producing a rather substantial amount of power considering the relatively light weight of the fueled gas generator compared to conventional gas or oil powered generators. Because of their high power to low weight ratio, these devices are especially suited to drive gas turbines and jet type engines for intermitent or short term use.

In some respects, gas generating compositions are similar to solid propellant compositions used to power rockets and missiles. Like missile propellant compositions, gas generating compositions must fulfill certain stringent physical requirements to be acceptable. For example, like missile propellant compositions, gas generating compositions must be ballistically stable after prolonged storage at extreme temperatures ranging from as high as 180° F. to as low as −80° F. In addition, particularly for aerospace and military applications, the compositions must be readily ignitable within these same temperature ranges. Furthermore, the compositions must be relatively insensitive to shock, be homogeneous in content, have substantial elasticity to minimize gaps or voids and must burn evenly and consistently. Finally, both types of compositions consist essentially of an oxidizer and a combustible fuel binder ordinarily supplemented by small quantities of various adjuvants. It should be mentioned that the adjuvants are optional components to the composition and will vary in type and content from composition to composition.

While as indicated above there are several areas of similarity between gas generating compositions and propellant compositions, the difference between the two types of compositions are even more significant. For example, while an oxidizer is also an integral part of a gas generating composition, the requirements for this oxidizer differ considerably from those used in missile propellants and in some respects the requirements are even more severe. Namely, the oxidizer in gas generating compositions unlike oxidizers in propellant compositions, must have a relatively slow burning rate and burn at relatively low flame temperatures. Another important requirement is that the combustion of these gas generating compositions evolve essentially particle free gases that are relatively nonerosive. In addition, ideally the burning rate of the gas generating composition should be as independent as possible of the temperatures and pressures produced during combustion. The need for these special requirements arises because of the different purposes for which the two compositions are designed. For example, the combustion of missile propellants produces exceedingly high flame temperatures, often in excess of 4000° F. These high flame temperatures are destructive to parts fabricated of the common commercial metal alloys such as the stainless steels over any sustained period of time. In fact, prolonged exposure to these higher temperatures attack many of the specially formulated so salled "heat resistant alloys." However, the erosion and corrosion of the metal missile parts that occurs during combustion is of little importance in missiles since they are designed as expendable "one-shot" pieces of hardware.

For the same reasons the presence of erosive or corrosive combustion products as evidenced by smoky combustion gases causes little concern. However, the effect that high combustion temperatures and erosive solid particles in the combustion gases have on gas turbine-type engines is far more serious. For example, the solid particels not only erode the metal parts they contact but they can clog the movable engine parts impairing performance as well as causing engine failure. This increases maintenance costs and reduces useful engine life. Since power generating devices are designed for long term use, dependability and long life are essential for commercial acceptance. Thus, the typical perchlorate-based propellant composition of the prior art have had little value as gas generating compositions.

That unmodified missile propellant compositions and gas generating compositions are not interchangeable has been established in the prior art. This is particularly the case in perchlorate based propellants. Perchlorate oxidizers are not only much more energetic than those used in gas generating compositions but also offer other important advantages. For example, the burning rate of perchlorate oxidizers is relatively independent of their temperature and pressure at combustion, whereas the burning rate of ammonium nitrate, a commonly used oxidizer in gas generating compositions is much more dependent upon the temperature and pressure. A further advantage that these oxidizers posess over ammonium nitrate is that they contain more oxygen. The higher oxygen content of the perchlorates tends to favor a smoother and more continuous combustion than is possible with ammonium nitrate.

In spite of the significant advantages that can be obtained when perchlorate-based oxidizers are used in gas generating compositions, little progress has been made in the preparation of perchlorate-based gas generating compositions because of a serious shortcoming that perchlorates possess for this purpose. This is the production of temperatures above 4000° F. This high flame temperature causes difficulty in both the construction and maintenance of gas generating devices. It would therefore be an important advance in the art to significantly reduce the flame temperature of perchlorate-based propellant compositions so that they can be used in gas-generating engines and devices.

Thus it is an object of this invention to convert previously non-utilizable missile propellant compositions into gas generating compositions useful for broader fields of application. These include compositions useful for actuating and powering mechanical devices, and turbine and jet engines among others.

Another more specific object of this invention is to convert highly energetic perchlorate based missile propellant compositions into useful gas generating compositions.

Yet another object of this invention is to prepare ballistically stable gas generating compositions whose burning rate is relatively independent of combustion temperatures and pressures.

Yet a further object of this invention is to prepare solid gas generating compositions whose combustion is not only smooth and continuous but produces lower flame temperatures than has been possible with other gas-generating compositions of the prior art.

Finally it is an object of this invention to prepare a novel class of perchlorate based gas generating compositions heretofore unknown to the art.

Other objects will become apparent to those skilled in the art from a consideration of the folowing detailed description.

As the result of an extended investigation, it has been discovered that the objects set forth above can all be accomplished by means set forth below.

In practice a novel and superior gas generating composition is prepared by mixing, casting, and curing the hydroxyl ammonium oxalate coolant of this invention with (1) an oxidizer (2) a combustible fuel binder with or without (3) propellant adjuvants or conditioning agents.

The gas-generating composition of this invention consists essentially of from about 10–[70]*60%* by weight of hydroxyl ammonium oxalate preferably above 20% by weight mixed with:

(1) From about 20–[80]*75%* by weight of an inorganic perchlorate oxidizer preferably ammonium perchlorate. However, the alkaline earth metal perchlorates and the alkali metal perchlorates are satisfactory.

(2) From about 15–35% by weight of a combustible fuel binder. The combustible fuel binder always includes a major amount of a polymeric composition and a minor amount of one or more curing agents. The preferred binders are the polyesters particularly the modified polyesters such as the carboxy-terminated linear polyesters, the polyester-polyurethane compolymers and the polyester-polyurethane polymers terminated with thiol groups. Other polymers which can be used are the polycarbonates, polyurethanes, the polyacrylates, the polyepoxides as well as the copolymers of one or more of these.

(3) Up to 10% by weight of a propellant adjuvant. As indicated earlier the presence of propellant adjuvants while not essential to the operability of the inventive gas generating compositions, are preferable to achieve optimum performance. Where such an adjuvant is used, it will ordinarily comprise between 0.25–5% by weight of the inventive gas generating composition and will seldom comprise more than 10% by weight of the gas-generating composition.

The above components of the gas generating mixture are mixed to form a homogeneous composition then cast or extruded, and cured using the procedures well known in the gas generator art so that they will burn evenly and continuously within the gas generator.

(1) OXIDIZER

As indicated earlier the perchlorate oxidizer, combustible fuel binder and propellant adjuvants can be varied both as to content and choice. For example, numerous perchlorates including the alkaline earth metal perchlorates, the alkali metal perchlorates, the metallic perchlorates generally and ammonium perchlorate can be used as oxidizers. However ammonium perchlorate is the favored perchlorate oxidizer primarily [fecause] *because* it produces more fully gaseous products during combustion than do the other perchlorates. In addition, it is available in large quantities in a high state of purity at low cost.

In general, varying proportions of the oxidizer can be employed in the gas generating compositions of this invention. For example, depending upon the use intended, the oxidizer can be present in the cured solid gas generating composition in sufficient quantity so that it makes up 20–[80]*75%* by weight of the finished compositions.

Compositions containing the lower percentage of oxidizer, in the range of 20–50%, have a lower burning rate and thus would be useful for gas turbine and jet aircraft starters; whereas the compositions containing the higher percentage (about 50–[80]*75%*) of oxidizer would be useful in preparing gas generating compositions where a higher burning rate is desirable. In all instances, the balance of the gas generating composition will consist of [20]*10–*60% by weight of the inventive coolant and 15–35% by weight of fuel binder with up to 10% by weight of one or more propellant adjuvants if desired.

(2) FUEL BINDER

The fuel binder referred to throughout this application refers to combustible polymeric resins or their precursors which can be cured to the desired hardness and which are utilized as fuels for the oxidizers. The term "fuel binder" as used throughout this invention not only includes the polymeric composition which is present in a major amount but also includes a minor amount of one or more curing agents used in the resin art which imparts the required rigidity or body to the final useable gas generating composition. Because the curing agent will vary according to the polymer or polymers being treated, the amount of curing agent or agents used cannot be stated with precision.

Fuel binders containing substantial quantities of oxygen in the molecule are favored in order to maximize the amount of available gaseous products and to assist in the oxidation of the binder. Among the many favored oxygen containing resins which can be used are the following: The polyamides, the polyesters the polycarbonates, the polyurethanes, the polyacrylates, the polyepoxides as well as these resins modified by nitration and the like or these resins copolymerized with other resins or each other. While the polysulfides, polyalkylenes and other non-oxygen containing polymeric binders can be utilized for gas generating composiitons their use is not particularly favored because they tend to evolve a significant amount of solid particles during combustion.

A group of fuel binders that are especially preferred because of their superior physical and combustion characteristics, are the polyesters, particularly the carboxy-terminated linear polyesters having a molecular weight ranging from 500 to 5000.

Where the preferred carboxy-terminated linear polyesters are used as fuel binders, the polyester can be prepared by reacting a polycarboxylic acid with a hydroxylated, preferably polyhydroxylated, compound under reaction conditions such as temperature, pressure and catalysts described in the resin art. The reaction product is a liquid carboxy-terminated prepolymer which is admixed with other components of the composition and cured to form the final gas generating composition.

Typical polycarboxylic acids which can be used as reactants in preparing the above described carboxy-terminated polyesters include oxalic, adipic, sebacic, maleic, fumaric, and others as well as mixtures of these acids. Hydroxylated reactants include, among others the glycols such as; ethylene glycol, diethylene glycol, propylene glycol polybutylene and polypropylene glycols, glycerols, sorbitols, castor oil, 1,2,6-hexane triol and the like as well as mixtures of these compounds and their analogues. In the alternative any of the numerous commercially available polyesters can be used as the source of the fuel binder.

Similarly where the binder is to be polyurethane based, the polyurethane can be made by reacting an organic isocyanate or diisocyanate with one or more polyols, polyethers, polyesters, or other hydroxylated materials in the presence of a suitable base such as an amine. Alternatively the polyurethane binder can be derived by curing commercially available polymers or their mixtures.

Whereas ordinarily the fuel binders contemplated are a single polymer, such as the polyacrylamides, the polyurethanes, the polysulfides, and the like, frequently it is advantageous to prepare mixtures of these resins or the resins modified by imparting additional functional groups to the resinous molecule. For example, a modified polyurethane resin can be prepared reacting a polyurethane with 1,2-ethane dithiol to result in a prepolymer which can be cured by the polysulfide type of cure. Another approach to the same type of prepolymer is to react a carboxy-terminated polyester with the 1,2-ethane dithiol.

In all instances, the resin used as a fuel binder is cured according to the curing techniques well known to the particular resin art using the usual polymerization catalysts, curing agents or accelerators commonly used. For example, the polyesters are cured at temperatures ranging from 80–180° F. and above, using the usual curing agents such as polyimines, polyepoxides, and the like. Similarly, the polyurethane prepolymers can be cured at temperatures varying between ambient and 200° F. and even higher when treated with curing agents such as polyols. Both the polysulfides and the mercaptan-terminated polyurethanes are cured at temperatures ranging from 120–200° F. using peroxide curing agents such as benzoyl peroxide. Since the methods of preparing or modifying the various resins used as binders are not the novel feature of this invention no attempt is made to describe these manipulations in detail. It shall suffice to say that the preparative methods and curing techniques are well known procedures described in the technical literature particularly in the "Plastics Application Series" published by Reinhold Publishing Corporation, New York City, New York.

(3) PROPELLANT ADJUVANTS

In addition to the curing agents, solvents, polymerization and vulcanization catalysts and the like which are included within the fuel binder content of the inventive gas generating compositions, certain conditioning or modifying agents can often be [advantageous] *advantageously* added to gas-generating compositions to alter or improve their physical and combustion characteristics. For [convenience] *convenience's* sake, these substances are herein generically referred to as propellant adjuvants and they can be present in the finished gas generating composition in amounts from up to about 10 parts by weight down to 0 part by weight of the final gas generating composition.

More commonly however, the adjuvants comprise from about 0.25 part by weight or even less up to about 5 parts by weight of the gas generating composition. Among the many propellant adjuvants which can be used are included the following typical materials: Plasticizers such as the alkylphthalates and the like, and darkening agents such as carbon black or lamp black, ballistic agents such as potassium sulfate, hydroscopicity inhibitors such as dinitrotoluene and various combustion catalysts. The combustion catalysts are of diverse structure but generally are compounds containing oxygen. These catalysts can be inorganic or organic compounds. They include, among many others, oxides, such as magnesium, iron, copper, titanium, calcium, molybdenum, and vanadium oxides and the like. Especially effective as combustion catalysts are the [chomates] *chromates* and dichromates, generally with ammonium dichromate being a preferred catalyst. Other satisfactory combustion catalysts include metallo organics such as iron and cobalt dicyclopentadienyl, and ferric and cobalt acetyl acetonate and certain dyes including copper phthalocyanine. Organics such as nitrocellulose can also be effectively used.

(4) PREFERRED GAS-GENERATING COMPOSITIONS

As indicated supra, for various reasons, certain individual components of the gas-generating compositions are preferred over others. Thus the preferred gas-generating compositions of this invention are made up of hydroxyl ammonium oxalate combined with:

(1) From about 20 [80]*75%* by weight of ammonium perchlorate oxidizer.
(2) From about 15–35% by weight of a carboxy-terminated linear polyester fuel binder.
(3) From about 0–10% by weight of a propellant adjuvant.

(5) COMPOUNDING THE INGREDIENTS

In preparing the solid gas generating composition the following procedure among many others can be used.

The dried oxidizer such as a perchlorate (20–80 parts by weight) is reduced to a finely divided condition by grinding or some other means. From about [20]*10–60* parts by weight of hydroxylammonium oxalate and from about 15–35 parts by weight of combustible fuel binder, either prepared earlier from the reactants, or as the commercially available monomer or polymer is placed in a blending vessel equipped with an efficient spark proof mixer and the fine particles of the oxidizer are added thereto.

Also added at this time are 0–10 parts by weight of any propellant adjuvants that are required. During these additions efficient mixing is maintained until a homogeneous mixture results. The total mixing time necessary for a uniform mixture varies according to the batch size but ordinarily at least 30 minutes of mixing is required with 90 minutes or more representing the extreme time. Finally the curing agent or agents where necessary are added and the mixing continued for an additional ½ to 1 hour. Finally the [uniformally] *uniformly* blended uncured gas generating composition is cast into a gas generator engine and the composition is cured at the required temperature until the desired hardness is obtained. The curing times and temperatures are dependent upon the particular resin used as a binder, and the batch size among other things and thus cannot be stated with precision. However, the following ranges of time and temperature are typical for curing gas generating compositions containing the fuel binders described below.

| Binder | Range of curing Temperatures, ° F. | Range of curing Time, hours |
|---|---|---|
| Polyester | 80–180 | 6–50 |
| Polyurethane | 80–200 | 6–70 |
| Polysulfide | 120–200 | 6–70 |

In order to illustrate the preparation and use of the novel gas generating compositions of this invention, the following examples are submitted.

Example 1.—Preparation of ammonium perchlorate-based gas generating composition using hydroxyl ammonium oxalate acid as coolant The combustible fuel binder used in this formulation is a polyester resin prepared by condensing 9.4 moles of adipic acid with 8.94 moles of diethylene glycol. The resulting polyester has an acid number of 60 and a viscosity of 90 poises at 27° C.

To a suitable blending vessel fitted with a vertical planetary mixer is added 21.48 parts by weight of the above polyester, 2.0 parts by weight of ammonium dichromate combustion catalyst and 28.0 parts by weight of hydroxyl ammonium oxalate. These components are mixed for 10 minutes, then 45 parts by weight of ammonium perchlorate oxidizer are added and the resultant blend mixed for an additional 30 minutes. At the end of this time, a curing system comprising 1.42 parts by weight of tris[1-(2-methyl)aziridinyl]phosphine oxide and 2.10 parts by weight of 1,1'-(sulfonyldiethylene)bis-2-methylaziridine is added and the mixture stirred for an additional 20 minutes. The flame temperature of the combustion is determined by casting a representative sample of the gas generating composition in a gas generator engine and curing at 135° F. for 24 hours. The flame temperature measured with a thermocouple during the engine firing is found to be about 1850° F.

Example 2.—Preparation of the ammonium perchlorate-based gas-generating composition of Example 1 without hydroxyl ammonium oxalate coolant In this example substantially the same formulation is used as described in Example 1. However, to indicate the critical role that the inclusion of the coolant into the propellant composition plays in the conversion of a typical propellant composition to a gas-generating composition, the hydroxyl ammonium oxalate in the formulation of Example 1 is replaced with an additional 28 parts by weight of ammonium perchlorate oxidizer. The equipment blending techniques and binder preparation are as described in Example 1.

To a suitable blending vessel fitted with a vertical planetary mixer is added 21.48 parts by weight of the polyester described in Example 1, 2.0 parts by weight of ammonium dichromate combustion catalyst, and 73.0 parts by weight of ammonium perchlorate. The components are mixed vigorously for 30 minutes. At the end of this time a curing system comprising 1.42 parts by weight of tris[1-(2-methyl)aziridinyl]phosphine oxide and 2.10 parts by weight of 1,1'-(sulfonyldiethylene)bis-2-methylaziridine are added and the mixture is stirred for an additional 30 minutes. A cured sample is prepared as described in Example 1 and the flame temperature measured in the same manner. The flame temperature during combustion is found to be at about 3500° F.

As the 1700° F. difference in flame temperature between the compositions of Example 1 and Example 2 indicates, the addition of hydroxyl ammonium oxalate coolant to the propellant composition substantially lowers flame temperature and makes the use of a typical perchlorate-based propellant as a gas-generating composition possible.

Example 3.—Preparation of a gas-generating composition using lesser and greater quantities of hydroxyl ammonium oxalate coolant In this example two formulations are prepared substantially as described in Example 1. The binder (including the same curing agents), oxidizer, and combustion catalysts and techniques are the same as previously described. In the first formulation the amount of hydroxyl ammonium coolant is reduced to 15% by weight largely by increasing the amount of ammonium perchlorate in the composition. In the second formulation the hydroxyl ammonium oxalate content is increased to 40% by weight at the expense of the ammonium perchlorate content.

The two formulations are as follows:

(I)

| Components: | Percent by weight |
|---|---|
| Ammonium perchlorate | 62 |
| Hydroxyl ammonium oxalate | 15 |
| Polyester fuel binder of Example 1 | 21 |
| Ammonium dichromate | 2 |

(II)

| Components: | |
|---|---|
| Ammonium perchlorate | 35 |
| Hydroxyl ammonium oxalate | 40 |
| Polyester fuel binder of Example 1 | 23 |
| Ammonium dichromate | 2 |

Both formulations are cast and cured at 135° F. for 24 hours. The flame temperatures are measured as described in Example 1. The flame temperatures of both formulations are less than 2500° F.

Examples 4–6.—Preparation of the formulation of Example 1 using other perchlorates In these examples the same polyester fuel binder, hydroxyl ammonium oxalate coolant and ammonium dichromate combustion catalyst described in Example 1 are used. The same quantities of these compounds are used and the identical blending techniques and procedures used in Example 1 are followed. The sole difference being that in each instance 28 parts by weight of the indicated perchlorate replaces ammonium perchlorate in the gas-generating composition on a weight by weight basis.

| Example Number | Perchlorate Oxidizer | Flame Temperature |
|---|---|---|
| 4 | Sodium | Less than 3,000° F. |
| 5 | Potassium | Do. |
| 6 | Lithium | Do. |

Examples 7–10.—Preparation of gas-generating compositions using various combustion catalysts Using the ammonium perchlorate oxidizer, the polyester binder and the hydroxyl ammonium oxalate coolant described in Example 1, comparable gas generating compositions are prepared except that the following combustion catalysts are substituted for ammonium dichromate on a weight by weight basis.

| Example number: | Combustion catalyst |
|---|---|
| 7 | 2% by weight ferric oxide. |
| 8 | 2% by weight cobalt oxide. |
| 9 | 2% by weight nitrocellulose. |
| 10 | 2% by weight cobalt acetyl acetonate. |

In each instance, smooth combustion is observed.

Example 11.—Preparation of another gas-generating composition utilizing a polyester-polyurethane binder The binder used in this example is of the polyester-polyurethane type. The particular binder or closely analogous binders are available commercially or can be prepared as described below.

The polyester is obtained by condensing 8.3 moles of adipic acid with 9.3 moles of diethylene glycol. The resulting condensate is treated with 2 moles of 2,4-toluene diisocyanate for 3 hours at 180° F. The isocyanate (NCO) content of the uncured polyester-polyurethane binder is found to be 3.6% by weight.

The gas generating composition is prepared by adding 14.4 parts by weight of the above binder, 2.0 parts by weight of ammonium dichromate combustion catalyst and 28.0 parts by weight of hydroxyl ammonium oxalate coolant to a suitable reactor fitted with a vertical planetary mixer. After the charge has mixed for 10 minutes, 45 parts by weight of ammonium perchlorate oxidizer is added and the mixing is continued for an additional 30 minutes. Another 10.6 parts by weight portion of the polyester-polyurethane binder is added and the charge mixed for an additional 20 minutes to assure the homogeniety of formulation.

A sample of the composition is cast in an engine and cured at 135° F. for 16 hours. A flame temperature of approximately 2150° F. is obtained.

Example 12.—Preparation of another gas-generating composition using a thiol-terminated binder The binder used in this example is a modification of the polyester-polyurethane binder used in Example 11. One mole of the binder of Example 11 is treated with 2 moles of 1,2-ethane dithiol to produce a thiol-terminated binder. These binders are advantageous because of their ease of curing. Again, all equipment, blending techniques and measurements are made as described in Example 1.

A vertical planetary mixer is charged with 23.15 parts by weight of the above binder, 2.0 parts by weight of ammonium dichromate combustion catalyst, 1.85 parts by weight of p-quinone dioxime curing agent and 28.0 parts by weight of hydroxyl ammonium oxalate coolant. The charge is thoroughly mixed for 10 minutes, at which time 45 parts by weight of ammonium perchlorate oxidizer is added and the mixing is continued for an additional 45 minutes.

A strand sample of the above composition is cured at 170° F. for 48 hours in an oven. A flame temperature of about 1800° F. is observed.

Having thus described my hydroxyl ammonium oxalate coolant and its use in gas-generating composition, I claim my invention as follows:

1. A curable homogenous gas-generating composition composed essentially of from about 10–60% by weight of hydroxyl ammonium oxalate coolant combined with:

(1) from about 20–[80]*75%* by weight of perchlorate oxidizer selected from the group consisting of ammonium perchlorate, the alkali metal perchlorates and the alkaline earth metal perchlorates, (2) from about 15–35% by weight of combustible fuel binder, (3) from about 0–10% by weight of a propellant adjuvant.

2. The composition of claim 1 wherein (1) the oxidizer is ammonium perchlorate.

3. The composition of claim 1 wherein (1) the oxidizer is sodium perchlorate.

4. The composition of claim 1 wherein (1) the oxidizer is potassium perchlorate.

5. The composition of claim 1 wherein (1) the oxidizer is lithium perchlorate.

6. The composition of claim 1 wherein (2) the combustible fuel binder is a polyester resin.

7. The composition of claim 1 wherein (2) the combustible fuel binder is polyester-polyurethane.

8. The composition of claim 1 wherein (2) the combustible fuel binder is a carboxy terminated linear polyester.

9. The composition of claim 1 wherein (3) the propellant adjuvant is ammonium dichromate.

10. The composition of claim 1 wherein (3) the propellant adjuvant is ferric oxide.

11. The composition of claim 1 wherein (3) the propellant adjuvant is cobaltic oxide.

12. The composition of claim 1 wherein (3) the propellant adjuvant is nitrocellulose.

13. The composition of claim 1 wherein (3) the propellant adjuvant is cobalt acetyl acetonate.

14. A curable homogeneous gas-generating composition composed essentially of from about [20]*10*–60% by weight of hydroxyl ammonium oxalate combined with:

(1) from about 20–[80]*75%* by weight of ammonium perchlorate oxidizer, (2) from 15–35% by weight of a polyester fuel binder, and (3) from about 0–5% by weight of ammonium dichromate.

15. The composition of claim 14 wherein (2) the polyester binder is of the polyester-urethane type.

16. The composition of claim 14 wherein the polyester binder is a thiol terminated polyester-urethane.

17. The composition of claim 14 wherein the polyester fuel binder is a carboxy terminated linear polyester.

18. The method of preparing a cured gas-generating composition which comprises mixing:

(1) from about 20–[80]*75%* by weight of perchlorate oxidizer selected from the group consisting of ammonium perchlorate, the alkali metal perchlorate, and the alkaline earth metal perchlorates, (2) from about 15–35% by weight of a combustible fuel binder including curing agents, (3) from about [20]*10*–60% by weight of hydroxyl ammonium oxalate coolant, and (4) from about 0–10% by weight of a propellant adjuvant, and casting the resultant mixture into a desired configuration and curing said mixture into a cured gas-generating composition.

19. The method of claim 18 wherein (2) the combustible fuel binder is a polyester.

20. The method of claim 18 wherein (2) the combustible fuel binder is a carboxy terminated linear polyester.

21. The method of claim 18 wherein the combustible fuel binder is a thiol terminated polyester-polyurethane.

22. The method of claim 18 wherein the combustible fuel binder is a polyester-polyurethane.

23. A method of reducing the flame temperature of perchlorate based gas-generating compositions comprising incorporating: 10–60 parts by weight of hydroxyl ammonium oxalate into each 100 parts of the gas-generating composition, said gas generating composition composed essentially of: combustible fuel binder, perchlorate oxidizer and propellant adjuvants.

24. The method of claim 23 wherein the combustible fuel binder is a polyester binder.

References Cited

The following references, cited by the Examiner, are of record in the patented file of this patent or the original patent.

UNITED STATES PATENTS

| | | | |
|---|---|---|---|
| 3,002,830 | 10/1961 | Barr | 149—83 X |
| 3,073,730 | 1/1963 | Doe et al. | 149—19 |

BENJAMIN R. PADGETT, *Primary Examiner.*